United States Patent
Ehbets et al.

(10) Patent No.: US 10,260,943 B2
(45) Date of Patent: Apr. 16, 2019

(54) COLOUR MEASUREMENT METHOD AND COLOUR MEASUREMENT DEVICE (71) Applicant: X-Rite Switzerland GmbH, Regensdorf (CH)

(72) Inventors: Peter Ehbets, Zurich (CH); Matthias Scheller Lichtenauer, Bubikon (CH)

(73) Assignee: X-Rite Switzerland GmbH, Regensdorf (CH)

(*) Notice: Subject to any disclaimer, the term of this patent is extended or adjusted under 35 U.S.C. 154(b) by 268 days.

(21) Appl. No.: 15/094,779

(22) Filed: Apr. 8, 2016

(65) Prior Publication Data
US 2016/0327431 A1 Nov. 10, 2016

(30) Foreign Application Priority Data

Apr. 8, 2015 (EP) .................................... 15162791

(51) Int. Cl.
*G01J 3/02* (2006.01)
*G01J 3/50* (2006.01)
(Continued)

(52) U.S. Cl.
CPC .............. *G01J 3/0297* (2013.01); *G01J 3/46* (2013.01); *G01J 3/504* (2013.01); *G01J 3/524* (2013.01)

(58) Field of Classification Search
CPC .. G01J 3/0297; G01J 3/46; G01J 3/504; G01J 3/524
See application file for complete search history.

(56) References Cited

U.S. PATENT DOCUMENTS 4,711,580 A 12/1987 Venable
6,166,814 A * 12/2000 Pringle ................. G01J 3/0251
356/445

(Continued)

FOREIGN PATENT DOCUMENTS

EP 1914529 A1 4/2008
EP 2703789 A1 3/2014
(Continued)

OTHER PUBLICATIONS

Kettler, W. H., Image Profiling: Managing Global Colour Consistency, DFO Conference on Quality Assurance and Testing Methods, 2008.

(Continued)

*Primary Examiner* — Vanthu T Nguyen
(74) *Attorney, Agent, or Firm* — Hahn Loeser & Parks LLP (57) ABSTRACT A color measurement device includes a measurement array (MA) which includes: a plurality of illumination arrays (20, 30, 40) for exposing a measurement spot (MS) on a measurement object (MO) to illumination light in an actual illumination direction (2, 3, 4) in each case, and a pick-up array (50) for detecting the measurement light reflected by the measurement spot (MS) in an actual observation direction (5) and for converting it into preferably spectral reflection factors; and a controller for the illumination arrays and the pick-up array and for processing the electrical signals produced by the pick-up array. The controller is embodied to process the measured reflection factors on the basis of a correction model, such that distortions in the measurement values as compared to nominal illumination and/or observation directions, caused by angular errors in the illumination arrays and/or the pick-up array, are corrected.

18 Claims, 5 Drawing Sheets

(51) Int. Cl.
*G01J 3/52* (2006.01)
*G01J 3/46* (2006.01)

(56) References Cited

U.S. PATENT DOCUMENTS

| | | | |
|---|---|---|---|
| 6,707,553 B1 | 3/2004 | Imura | |
| 7,262,854 B2 * | 8/2007 | Imura | G01J 3/02 356/402 |
| 7,283,244 B2 * | 10/2007 | Takagi | G01J 3/46 356/445 |
| 2011/0143017 A1 | 6/2011 | Kettler | |

FOREIGN PATENT DOCUMENTS

| | | |
|---|---|---|
| EP | 2728342 A1 | 5/2014 |
| EP | 15162791.6 | 4/2015 |

OTHER PUBLICATIONS

Kirchner, E. et al., Making Sense of Measurement Geometries for Multi-Angle Spectrophotometers, Color Research & Application 37.3 (2012), pp. 186-198.
Kettler, W. H., Colour Management, Farbe & Lack Seminars Module 2: Deeper Insignts into Colorimetry, Jun. 25-27, 2014, Society for Research into Pigments and Paints (FPL), Stuttgart (English version fron 2012).
European Search Report dated Oct. 2, 2015 for EP 15162791.

* cited by examiner

COLOUR MEASUREMENT METHOD AND COLOUR MEASUREMENT DEVICE

BACKGROUND

1. Technical Field

The present invention relates to colour measurement methods and to colour measurement devices.

2. Background Art

Colour measurement devices of the type under discussion can be embodied, irrespective of the underlying measurement technology, as autonomous devices or as peripheral measurement devices for use in connection with a controlling computer which evaluates measurement data. Autonomous colour measurement devices contain all the operating and display members necessary for measurement operations and also their own power supply and are in many cases also equipped with an interface for communicating with a computer, wherein both measurement data and control data can be exchanged with the computer. Colour measurement devices which are configured as peripheral measurement devices do not generally have their own operating and display members and are controlled by the superordinate computer like any other peripheral computer device. For communicating with a computer, more modern colour measurement devices are often for example fitted with a so-called USB (universal serial bus) interface, via which in many cases it is simultaneously also possible to supply power (from the attached computer).

Metallic paints and paints containing effect pigments are being used more and more nowadays, not only in the automobile industry. Such paints show a significant angular dependence. Paints containing aluminium flakes, for example, show a significant brightness flop. Paints containing interference effect pigments also show differences in colour when the observation or illumination direction is changed, for this purpose. Multi-angle measurement devices have become established for measuring such paints. Measuring brilliance is a related topic, in which the measurement result is likewise angle-sensitive.

Measurement devices which can detect such properties have to be embodied to illuminate the measurement object in one or more different, exactly defined illumination directions (nominal illumination directions) and to pick up the light reflected by the measurement object from at least one exactly defined observation direction (nominal observation direction). The observation direction and the illumination direction can be swapped in accordance with the Helmholtz reciprocity theorem. Colour measurement devices of this type are for example described in great detail in the documents EP 2 703 789 A1 and EP 2 728 342 A1.

In the publication "Device Profiling: Managing Global Colour Consistency" by Wilhelm H. Kettler, DFO Conference on Quality Assurance and Testing Methods 2008, different causes are presented which can lead to measurement errors when using such colour measurement devices. These include in particular the so-called systematic errors which are due to certain deficiencies of the device, such as for example faulty calibration. In a lecture entitled "Colour Management" given by Wilhelm H. Kettler for FARBE & LACK Seminars Module 2: Deeper Insights into Colorimetry, 25-27 Jun. 2014, Society for Research into Pigments and Paints (FPL), Stuttgart, particular reference is also made to so-called angular errors which can result from the geometrical conditions of the illumination and observation beam paths and from the apertures of the illumination and observation beam paths. Angular errors, i.e. deviations between actual illumination and observation directions of the measurement device and corresponding nominal illumination and observation directions as predetermined by the measurement geometry selected, have a particularly significant effect, precisely when performing measurements on samples containing effect paints.

The present invention deals primarily with avoiding and/or compensating for or correcting measurement errors caused by such angular errors.

Documents EP 2 703 789 A1 and EP 2 728 342 A1 describe methods and measures on how distortions in the measurement values caused by angular errors in the measurement device can be corrected. The measures described in these documents, however, require more apparatus and/or more complex measurement devices and are also relatively elaborate in purely procedural terms.

In the publication "Making Sense of Measurement Geometries for Multi-Angle Spectrophotometers" by Eric Kirchner and Werner Cramer in Color Research & Application 37.3 (2012), pages 186-198, a formalism is described regarding how paired combinations of illumination directions and observation directions are unambiguously assigned a direction in which an effect pigment flake has to be orientated in a paint in order to reflect the illumination specularly in the observation direction. This direction is referred to in the literature as the flake normal angle (cf. FIG. 3). Assigning this direction to a combination of an illumination direction and an observation direction is called "transforming into the flake angle space" in the following. The orientation of the effect pigment flake in the flake angle space, i.e. the flake normal angle, can be the same for multiple combinations of an illumination direction and an observation direction.

It is the intention of the present invention to improve a colour measurement method and a corresponding colour measurement device of the respective generic type to the effect that distortions in the measurement values caused by angular errors in the different measurement channels (illumination and observation directions) can be corrected in a relatively simple way and without adding to the complexity of the colour measurement device, such that the nominal illumination and observation directions predetermined by the respective measurement geometry are exactly maintained and distortions in the measurement values are thus avoided. Another aim is to improve the degree of match between measurement values from different colour measurement devices of the same design.

SUMMARY

This object on which the invention is based is solved by the colour measurement method in accordance with the invention, as characterised by the features of independent Claim 1, and by the colour measurement device in accordance with the invention, as characterised by the features of independent Claim 11. Advantageous embodiments and developments of the colour measurement method in accordance with the invention and the colour measurement device in accordance with the invention are the subject-matter of the dependent claims.

With respect to the colour measurement method, the essence of the invention is as follows. In a colour measurement method, a measurement spot on a measurement object is exposed to illumination light, by means of a colour measurement device, in at least one actual illumination direction of the colour measurement device, and preferably spectral reflection factors of the measurement light reflected by the measurement spot are measured in at least one actual observation direction of the colour measurement device. The measured reflection factors are corrected with respect to distortions in the measurement values caused by deviations between the actual illumination and observation directions of the colour measurement device and nominal illumination and observation directions predetermined by the measurement geometry of the colour measurement device. A continuous correction model is formed from the measured reflection factors and the actual illumination and observation directions of the colour measurement device, wherein said model represents the connection between the measured intensity of the measurement light reflected by the measurement spot and changes in the difference in the illumination and observation directions. The measured reflection factors are corrected on the basis of this correction model by incorporating the actual and nominal illumination and observation directions of the colour measurement device.

Calculating and applying a correction model, in accordance with the invention, allows a relatively simple correction of the distortions in the measurement values caused by angular errors, without changing the design of the colour measurement device used. The correction model can be uniformly used for all measurement geometries.

In accordance with one advantageous embodiment of the colour measurement method in accordance with the invention, an actual brightness reflection also called luminance reflectance factor is calculated from the measured reflection factors for each paired combination of illumination and observation directions, and a nominal brightness reflection also called luminance reflectance factor is calculated from said actual brightness reflection factors in each case on the basis of the correction model and the actual and nominal illumination and observation directions of the colour measurement device. The measured reflection factors are then corrected on the basis of the actual brightness reflection factors and the nominal brightness reflection factors.

In accordance with a particularly advantageous embodiment, the actual and nominal illumination and observation directions of the colour measurement device are transformed into flake normal angles, and the correction model and the nominal brightness reflection also called luminance reflectance factors are calculated in the space of the flake normal angles, wherein the nominal brightness reflection, also called luminance reflectance factors are expediently calculated from the respective residual between the actual brightness reflection, also called luminance reflectance factors and the correction model.

The measured reflection factors are advantageously calculated on the basis of the difference between the actual brightness reflection, also called luminance reflectance factors and the nominal brightness reflection, also called luminance reflectance factors.

In order to calculate the correction model, the measurement spot on the measurement object is advantageously exposed to illumination light in at least three, preferably at least five different actual illumination directions. It is likewise advantageous if the measurement light reflected by the measurement spot is detected and measured in at least two different actual observation directions.

In one advantageous modification of the colour measurement method in accordance with the invention, the actual illumination and observation directions of a target colour measurement device of the same measurement geometry are used as the nominal illumination and observation directions for correcting the measured reflection factors. The colour measurement device used can thus be matched to the target colour measurement device with respect to the measurement results.

With respect to the colour measurement device, the essence of the invention is as follows. A colour measurement device comprises a measurement array which comprises: at least one illumination array for exposing a measurement spot on a measurement object to illumination light in an actual illumination direction in each case, and at least one pick-up array for detecting the measurement light reflected by the measurement spot in an actual observation direction in each case and for converting it into preferably spectral reflection factors; and a computer-based controller for the at least one illumination array and the at least one pick-up array and for processing the reflection factors produced by the at least one pick-up array. The colour measurement device also comprises means for correcting the measured reflection factors with respect to distortions in the measurement values caused by deviations between the actual illumination and observation directions of the colour measurement device and nominal illumination and observation directions predetermined by the measurement geometry of the colour measurement device. The controller is embodied to form a continuous correction model from the measured reflection factors and the actual illumination and observation directions of the colour measurement device, wherein said model represents the connection between the measured intensity of the measurement light reflected by the measurement spot and changes in the difference in the illumination and observation directions. The controller is also embodied to correct the measured reflection factors on the basis of this correction model by incorporating the nominal illumination and observation directions of the colour measurement device.

The controller is expediently embodied to calculate an actual luminance reflectance factor, which represents the intensity, from the measured reflection factors for each paired combination of illumination and observation directions, and to calculate a nominal luminance reflectance factor from the actual luminance reflectance factors in each case on the basis of the correction model and the nominal illumination and observation directions of the colour measurement device.

The controller is also expediently embodied to correct the measured reflection factors on the basis of the actual brightness reflection, also called luminance reflectance factors and the nominal, also called luminance reflectance factors.

The controller is then advantageously embodied to transform the actual and nominal illumination and observation directions of the colour measurement device into flake normal angles and to calculate the correction model and the nominal luminance reflectance factors in the space of the flake normal angles.

The controller is also expediently embodied to calculate the nominal luminance reflectance factors from the respective residual between the actual luminance reflectance factors and the correction model.

The controller is also expediently embodied to calculate the measured reflection factors on the basis of the difference between the actual brightness reflection also called luminance reflectance factors and the nominal brightness reflection also called luminance reflectance factors.

The colour measurement device advantageously comprises at least three, preferably at least five illumination arrays for illuminating the measurement spot in different actual illumination directions. The colour measurement device advantageously also comprises at least two pick-up arrays for detecting the measurement light from different actual observation directions.

BRIEF DESCRIPTION OF THE FIGURES

In the following, the invention is explicated in more detail on the basis of the drawings, which show.

DESCRIPTION OF EXEMPLARY EMBODIMENT(S)

The following rule applies to the description of the figures below: wherever individual reference signs are not entered in a figure, reference is made in this respect to the other figures and the corresponding parts of the description. The term "measurement array" is understood to mean the sum of the components of the colour measurement device which serve to illuminate a measurement spot on the surface of a measurement object and to detect the light reflected by this measurement spot and convert it into corresponding electrical signals. The term "device normal" is to be understood to mean an (imaginary) line which is fixed relative to the device and (ideally) perpendicular to the surface of the measurement object when using the colour measurement device in practice, and which defines the centre point of the measurement spot. The term "actual illumination direction" is to be understood to mean the direction in which the measurement spot is illuminated. Similarly, the term "actual observation direction" is to be understood to mean the direction from which the measurement light reflected by the measurement spot is picked up. The terms "nominal illumination directions" and "nominal observation directions" are to be understood to mean the illumination and/or observation directions for which the colour measurement device is configured in accordance with its underlying measurement geometry. The actual illumination and observation directions may deviate (slightly) from the nominal illumination and observation directions, for example due to production tolerances. The term "specular direction" is to be understood to mean the nominal observation direction reflected on the surface of the (planar) measurement object. A multi-angle colour measurement device has multiple actual illumination directions (and also, as applicable, multiple actual observation directions). The term "measurement plane" is to be understood to mean a plane which extends through the device normal and all the illumination directions and the observation direction(s) and also the specular direction. All the actual and nominal angles specified refer to directions lying within the measurement plane.

In terms of its general design, the colour measurement device in accordance with the invention is largely similar in design to the devices disclosed in the documents EP 2 703 789 A1 and EP 2 728 342 A1 mentioned in the background. It comprises a housing which accommodates a measurement array and an electronic controller. A display array is provided on the front side of the housing. Operating members are also arranged on the upper side of the housing. An interface (preferably a USB interface) for connecting the housing to an external computer is situated laterally on the housing. The lower side of the housing comprises a measurement opening through which illumination light can exit the interior of the housing and, conversely, through which measurement light can enter the interior of the housing from without (cf. FIG. 1 in EP 2 728 342 A1).

Figure 1:
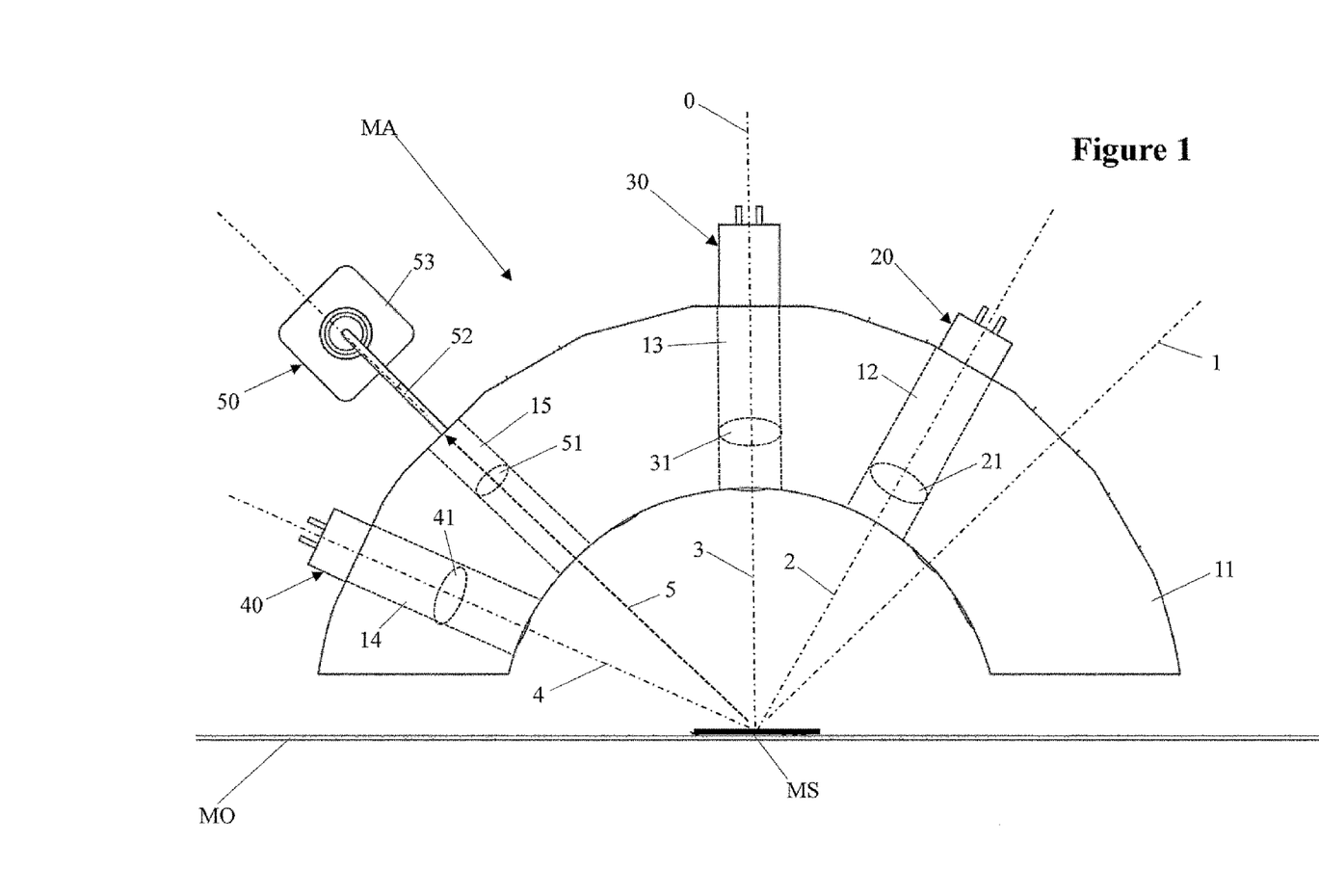
FIG. 1 a somewhat simplified representation of the essential design of an example embodiment of the colour measurement device in accordance with the invention.

An exemplary embodiment of the measurement array situated in the housing can be seen from FIG. 1. The measurement array, which is indicated as a whole by the reference sign MA, comprises an arc body 11 which is attached, spatially fixed, in the housing and in which all the optical and/or photoelectric components of the measurement array MA are arranged—in the example embodiment shown, in four continuous chambers 12, 13, 14 and 15. In the example embodiment shown, these components consist of three illumination arrays 20, 30 and 40 and one pick-up array 50 comprising a spectrometer 53 to which the measurement light is fed via a lens 51 and a light conductor 52. The spectrometer 53 itself is situated outside the chamber 15. Each of the three illumination arrays 20, 30 and 40 is assigned a lens 21, 31 and 41, respectively. The three illumination arrays 20, 30 and 40, which typically each comprise a light source comprising at least one or more light-emitting diodes exhibiting different emission spectra, respectively illuminate a measurement spot MS on a measurement object MO with parallel bundles of beams via the assigned lenses 21, 31 and 41. The illumination arrays 20, 30 and 40 are each aligned in an actual illumination direction 2, 3 and 4, respectively, wherein said actual illumination directions ideally match the nominal illumination directions predetermined by the underlying measurement geometry, but in practice exhibit a deviation from the nominal illumination directions (which in most cases is very small but not negligible) due to production tolerances. The pick-up array is aligned in an actual observation direction 5 which likewise ideally matches the nominal observation direction predetermined by the underlying measurement geometry, but in practice exhibits a deviation from the nominal observation direction (which in most cases is very small but not negligible) due to production tolerances. The measurement array MA as a whole is arranged such that the illumination directions and the observation direction are situated in a common measurement plane which also contains a device normal indicated by the reference sign 0. The measurement plane also contains a specular direction 1, away from which—as the reference direction—the angular positions of the illumination directions 2, 3 and 4 and the observation direction 5 are conventionally measured. The example embodiment shown exhibits a measurement geometry in which the three nominal illumination directions (not shown) extend at an angle of 15°, 45° and 110°, respectively, to the specular direction 1, wherein the second nominal illumination direction coincides with the device normal 0. The nominal observation direction (also not shown) extends at an angle of 90° to the specular direction 1 in the example embodiment shown.

The lenses 21, 31, 41 and 51 can also be completely or partially omitted. Similarly, illuminating with parallel light is not obligatory.

The measurement array MA can also comprise fewer or more illumination arrays and also more than one pick-up array, as is for example the case in the colour measurement device described in the document EP 2 728 342 A1.

In the example embodiment shown, the illumination and observation beam paths are embodied to be linear. It is however also possible to deviate, i.e. for example deflect by means of mirrors, one or more of the beam paths, for example for reasons of space. It is merely essential for the optical axes of the beam path portions which lead directly to and/or away from the measurement spot to lie in a common measurement plane.

Figure 2:
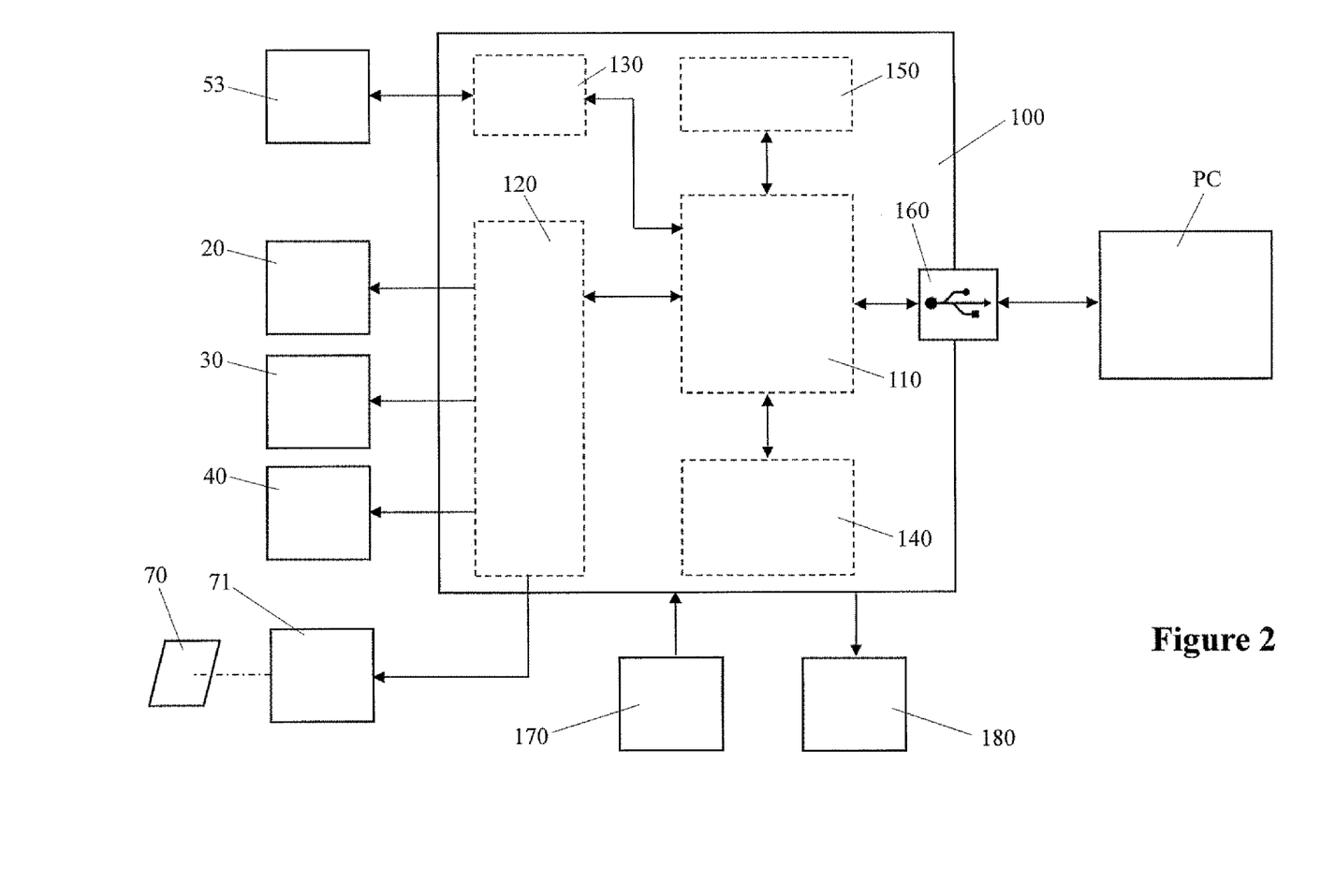
FIG. 2 a block diagram of the computer-based controller of the colour measurement device.

The illumination arrays 20, 30 and 40 are controlled by a computer-based controller 100 (FIG. 2). The controller 100 also controls the pick-up array 50 and/or its spectrometer 53 and processes the latter's measurement signals. The controller 100 can display measurement results on the display array and receive operating commands from the operating members. Via the interface mentioned, it can also communicate with an external computer PC and in particular transmit measurement data and receive commands and control data. Additional details in this respect are described further below in connection with FIG. 2.

Before the colour measurement device is ready for use, it is first calibrated on the basis of dark measurements and measurements on a white tile (white reference) in a way which is known in its own right, wherein the measurements on the white tile are taken separately for each illumination array and pick-up array.

As in the known colour measurement devices of this type, the measuring process is in principle performed such that a full spectrum comprising a multitude of interpolation points (wavelength ranges with a width of for example 10-20 nm each) across the wavelength range of interest (in most cases, the visible spectrum plus the near UV) is recorded separately for each illumination channel (illumination arrays 20, 30, 40) by means of the pick-up array 50. For this purpose, the spectrometer 53 is activated (put on standby for measuring) by the controller 100 for a certain time frame, and the light source of the respective illumination array is activated and/or switched on for a particular period of time within this time frame. The time frame corresponds to the integration time of the spectrometer.

FIG. 2 is a block diagram showing how the individual components of the colour measurement device in accordance with the invention co-operate. The computer-based controller 100 which has already been mentioned comprises, as its most important functional units, a micro-controller 110, a hardware control stage 120, a spectrometer control stage 130, a program memory and/or firmware memory 140, a data memory 150, a USB interface 160, operating members 170 and a display array 180, wherein the micro-controller 110 co-ordinates and controls the whole and is also responsible for communicating with an external computer PC which is attached via the USB interface 160.

The hardware control stage 120 actuates the illumination arrays 20, 30, 40, i.e., switches the light sources contained within them on and off, respectively. In addition, the hardware control stage 120 also controls a drive 71 which is arranged in the colour measurement device and using which a white tile 70, which is likewise provided in the colour measurement device, can be introduced into and/or removed again from the measurement beam path of the colour measurement device.

The spectrometer control stage 130 activates the spectrometer 53 and reads the measurement data produced by it, prepares them and converts them into digital measurement signals (spectral reflection factors).

The (non-volatile) program memory 140 contains the firmware and/or software necessary for controlling and for preparing data. If the colour measurement device is configured as a peripheral device for a superordinate computer, the programs for controlling and for preparing data can alternatively also run completely or partially on the external computer.

The (non-volatile) data memory 150 contains parameters which are substantially device-specific, such as for example integration times for the spectrometer and activation times for the individual illumination arrays, as well as other data necessary for the colour measurement and/or correction method described further below.

To this extent, the colour measurement device described essentially corresponds to the colour measurement devices of this type which are disclosed in the documents EP 2 703 789 A1 and EP 2 728 342 A1, such that the person skilled in the art does not require any further explication in this respect.

The present invention is not concerned with the underlying measurement technology as such or with evaluating the measurement results but rather with the problem of distortions in the measurement results caused by alignment errors and/or angular errors, in particular of the illumination arrays (as compared to an ideal device exhibiting exactly nominally aligned illumination and observation directions). This and eliminating and/or compensating for such measurement distortions in accordance with the invention is discussed in the following in more detail on the basis of FIGS. 3 to 6, wherein it is assumed that the colour measurement device has already been dark-calibrated and white-calibrated.

Figure 3:
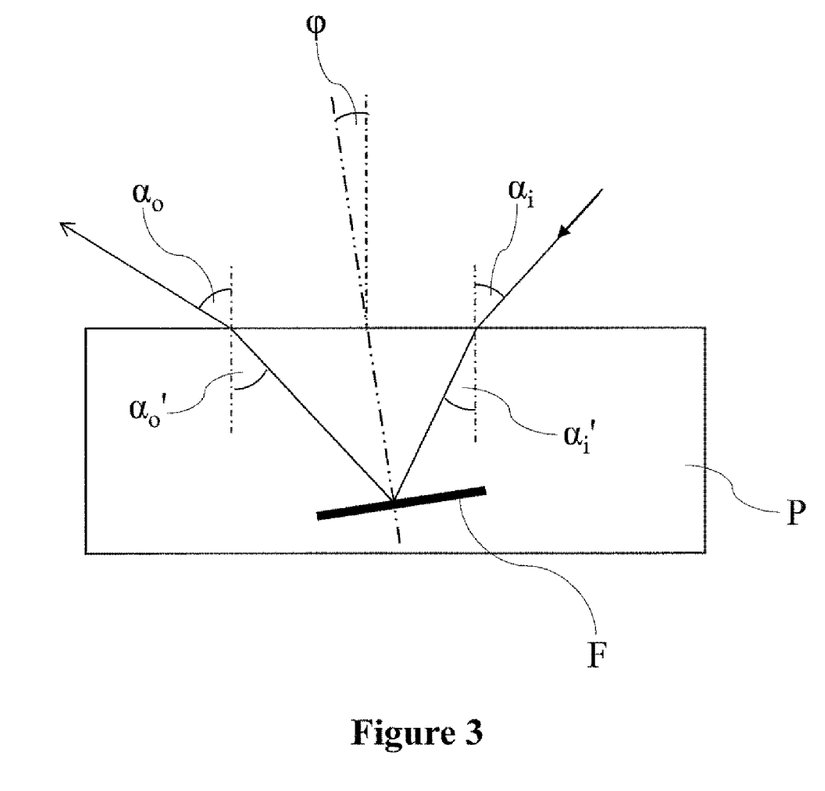
FIG. 3 a schematic sketch for explicating the flake normal angle.

The flake normal angle φ already mentioned at the beginning plays an important role in the colour measurement method in accordance with the invention and/or colour measurement device in accordance with the invention. The flake normal angle φ respectively links an illumination direction (incident angle $\alpha_i$) to an observation direction (observation angle $\alpha_o$), as is illustrated in FIG. 3. An effect paint layer in which a flake F is situated is indicated by the reference sign P, wherein the orientation of the flake F and/or the flake normal is such that the light entering at the incident angle specularly exits in the observation direction. The flake normal angle φ can be calculated from the respective illumination direction (incident angle $\alpha_i$) and the respective observation direction (observation angle $\alpha_o$) on the basis of simple geometrical considerations and laws of refraction, as follows:

$$\varphi = (\alpha_o' - \alpha_i')/2 \text{ where}$$

$$\sin(\alpha_i') = \sin(\alpha_i) * n_1/n_2$$

$$\sin(\alpha_o') = \sin(\alpha_o) * n_1/n_2$$

where $n_1$ is the refraction index of air and $n_2$ is the refraction index of the (transparent) substrate material of the effect paint P. In other words, each specific combination of an illumination direction (incident angle $\alpha_i$) and an observation direction (observation angle $\alpha_o$) can be transformed into a corresponding flake normal angle φ (if the refraction index $n_2$ is known).

In accordance with an underlying concept of the invention, this transformation into the flake angle space is then used as the starting point for correcting the distortions in the measurement values caused by angular errors, wherein it is presupposed that the actual illumination directions of the illumination arrays and the actual observation direction of the pick-up array (or, if there are multiple pick-up arrays, the actual observation directions) of the colour measurement device used are exactly known. Said actual illumination and observation directions of the specific colour measurement device can for example be gauged by the manufacturer, wherein the corresponding data are stored in the colour measurement device. The actual illumination and observation directions of the specific colour measurement device can however also be gauged and stored by the user, by means of methods which are known in their own right.

In a first step of the colour measurement method in accordance with the invention, with the colour measurement device on the measurement object to be gauged, a set of spectral reflection factors are measured, i.e. one spectrum for each of all the (paired) combinations of actual illumination and observation directions. The values thus obtained are referred to in the following as spectral raw data $R_i(\lambda)$, where the index i stands for each specific paired combination of actual illumination and observation directions.

The reflection factor can be evaluated for each wavelength or for a subset of wavelengths. Alternatively, an actual brightness reflection also called luminance reflectance factor $R(\varphi_{ai})$ which represents the intensity of the measurement light is respectively calculated for each specific combination i of actual illumination and observation directions in a suitable representation of the whole reflection spectrum (for example, the average values across all the wavelengths).

The colour measurement method in accordance with the invention is based on the physically substantiated assumption that the light emitted by a particular illumination array changes its intensity, as measured by a pick-up array, continuously as the difference in the illumination and observation directions changes. Accordingly, a continuous parameterised model of the intensity profile across the illumination and observation directions is formed, by adaption, from all the actual brightness reflection also called luminance reflectance factors and the corresponding actual illumination and observation directions. This model is referred to in the following as the correction model or correction function. The first co-ordinate of the correction function is given by the illumination and observation directions, and the second co-ordinate represents the intensities measured in said illumination and observation directions. The correction function unambiguously assigns each combination of an illumination direction and an observation direction a (brightness) reflection factor. With the aid of the correction function and the residual between given points and/or actual brightness reflection factors and the correction function, each combination of a nominal illumination direction and a nominal observation direction is then unambiguously assigned a nominal brightness reflection factor within the definition range of the correction function.

In a preferred embodiment of the invention, the first co-ordinate, i.e. the argument of the correction function, is defined in the flake angle space by the flake normal angle $\varphi$. By transforming the illumination and observation directions into the flake angle space, it is possible to simultaneously correct measurements from multiple pick-up arrays. The aspecular angle can be used as an alternative to the flake normal angle. The aspecular angle is defined in air and calculated for a measurement geometry from the angular difference between the observation direction and the direction of the specular reflection of the illumination.

The preferred embodiment of the method in accordance with the invention, which operates in the flake angle space, is explicated more specifically in the following.

For each specific combination i of actual illumination and observation directions, a corresponding actual flake normal angle $\varphi_{ai}$ is calculated. The refraction index $n_2$ of the measurement object is incorporated into this calculation, as explicated further above, and would therefore have to be known and/or measured. The refraction index measures about 1.5 for typical effect paints. For performing measurements on such effect paints, an accuracy which is sufficient for practical purposes is satisfied if this value is assumed. Given these assumptions, the actual flake normal angles $\varphi_{ai}$ can however also be determined before the actual colour measurement and/or even by the manufacturer and stored in the colour measurement device.

Figure 4:
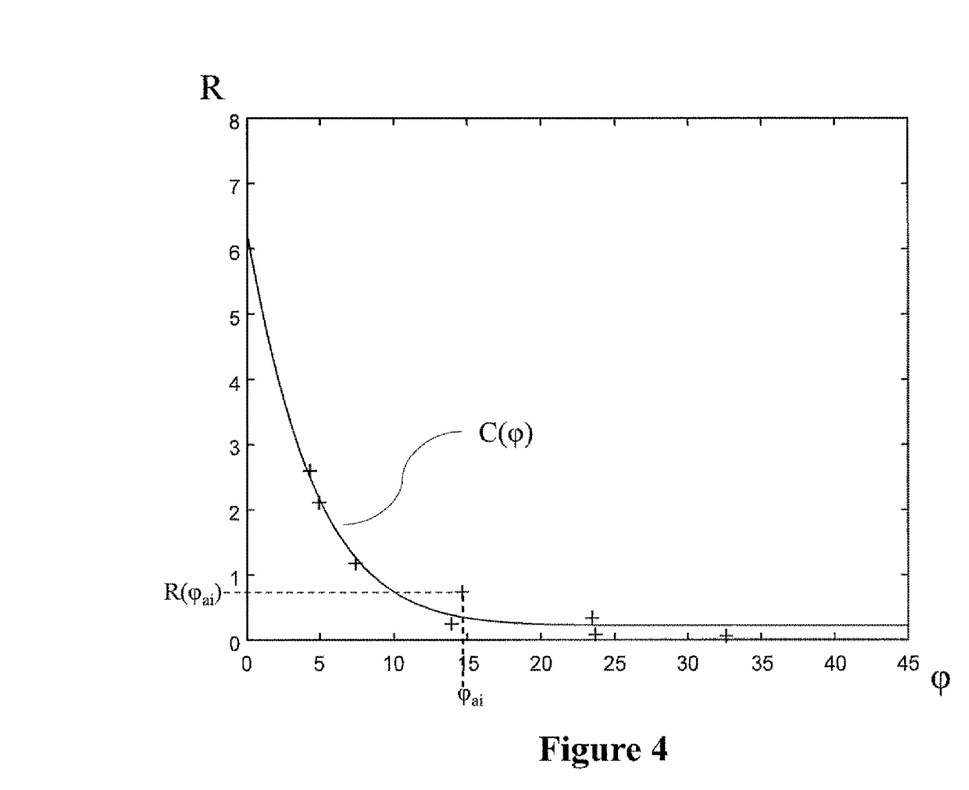
FIG. 4 an example of a correction function used in the colour measurement method in accordance with the invention.

Each actual brightness reflection factor $R(\varphi_{ai})$ measured (and/or calculated from the measurements) is assigned to the corresponding calculated (and/or stored) actual flake normal angle $\varphi_{ai}$. This assignment is shown in a graph in FIG. 4, wherein the crosses which are not labelled represent the individual actual flake normal angles and their assigned brightness reflection factors, i.e. FIG. 4 shows the actual brightness reflection factors in the flake angle space.

It can be seen from FIG. 4 that the reflection factors rise very sharply at flake normal angles below about 5°, while they initially drop slightly further and then remain practically constant at flake normal angles over about 5°. Correspondingly, angular errors have a substantially greater effect at very small flake normal angles than at relatively large flake normal angles.

A correction function $C(\varphi)$ is then determined from the actual brightness reflection factors $R(\varphi_{ai})$ and the corresponding actual flake normal angles $\varphi_{ai}$. The correction function is determined and/or adapted in accordance with any equalisation method which is known in its own right, such that it matches the interpolation points, as given by the actual brightness reflection factors, as well as possible. The raw data are then corrected (in multiple steps) on the basis of the correction function $C(\varphi)$ determined in this way.

For each combination i of the actual illumination and observation directions, a corresponding nominal flake normal angle $\varphi_{ni}$ is initially calculated from the respectively corresponding combination of nominal illumination and observation directions. The refraction index $n_2$ of the measurement object is again incorporated into this calculation and would therefore have to be measured. As when calculating the actual flake normal angles $\varphi_{ai}$, however, an accuracy which is sufficient for practical purposes can also be achieved in this case by assuming a value of 1.5. Given these presuppositions, the nominal flake normal angles $\varphi_{ai}$ could also be determined even by the manufacturer and stored in the colour measurement device.

Figure 5:
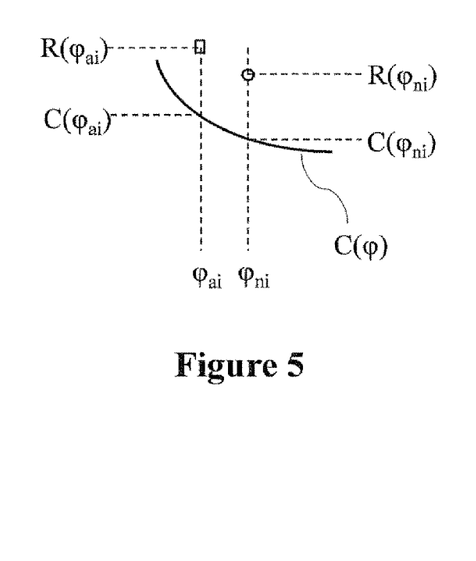
FIG. 5 a sketch for explicating the angular correction used in the colour measurement method in accordance with the invention.

A nominal brightness reflection factor $R(\varphi_{ni})$ is then calculated from each actual brightness reflection factor $R(\varphi_{ai})$. This can be achieved by means of the correction function $C(\varphi)$, for example in accordance with the relationship:

$$R(\varphi_{ni})=C(\varphi_{ni})+[R(\varphi_{ai})-C(\varphi_{ai})],$$

where $C(\varphi_{ni})$ is the value of the correction function $C(\varphi)$ for the nominal flake normal angle $\varphi_{ni}$, and $C(\varphi_{ai})$ is the value of the correction function $C(\varphi)$ for the actual flake normal angle $\varphi_{ai}$. This is illustrated by FIG. 5. The expression $[R(\varphi_{ai})-C(\varphi_{ai})]$ represents the residual between the respective actual brightness reflection factor $R(\varphi_{ai})$ and the correction model and/or correction function $C(\varphi)$.

In a simpler implementation, the local pitch of the flake normal angles $\varphi_{ni}$ and $\varphi_{ai}$ in the correction function $C(\varphi)$ of FIG. 4 can be taken as the difference $C(\varphi_{ni})-C(\varphi_{ai})$.

The nominal brightness reflection factors $R(\varphi_{ni})$ calculated in this way are then adduced in order to correct the raw data $R_i(\lambda)$, wherein each spectrum $R_i(\lambda)$ recorded for a specific combination i of actual illumination and observation directions is of course corrected separately on the basis of the nominal brightness reflection factor $R(\varphi_{ni})$ calculated for the respective combination.

The spectral raw data $R_i(\lambda)$ can for example be corrected multiplicatively (through scaling) in accordance with the formula:

$$R_{ic}(\lambda)=R_i(\lambda)*[R(\varphi_{ni})-R(\varphi_{ai})]/R(\varphi_{ai}),$$

where $R_{ic}(\lambda)$ is the angularly corrected spectral data sought.

Figure 6:
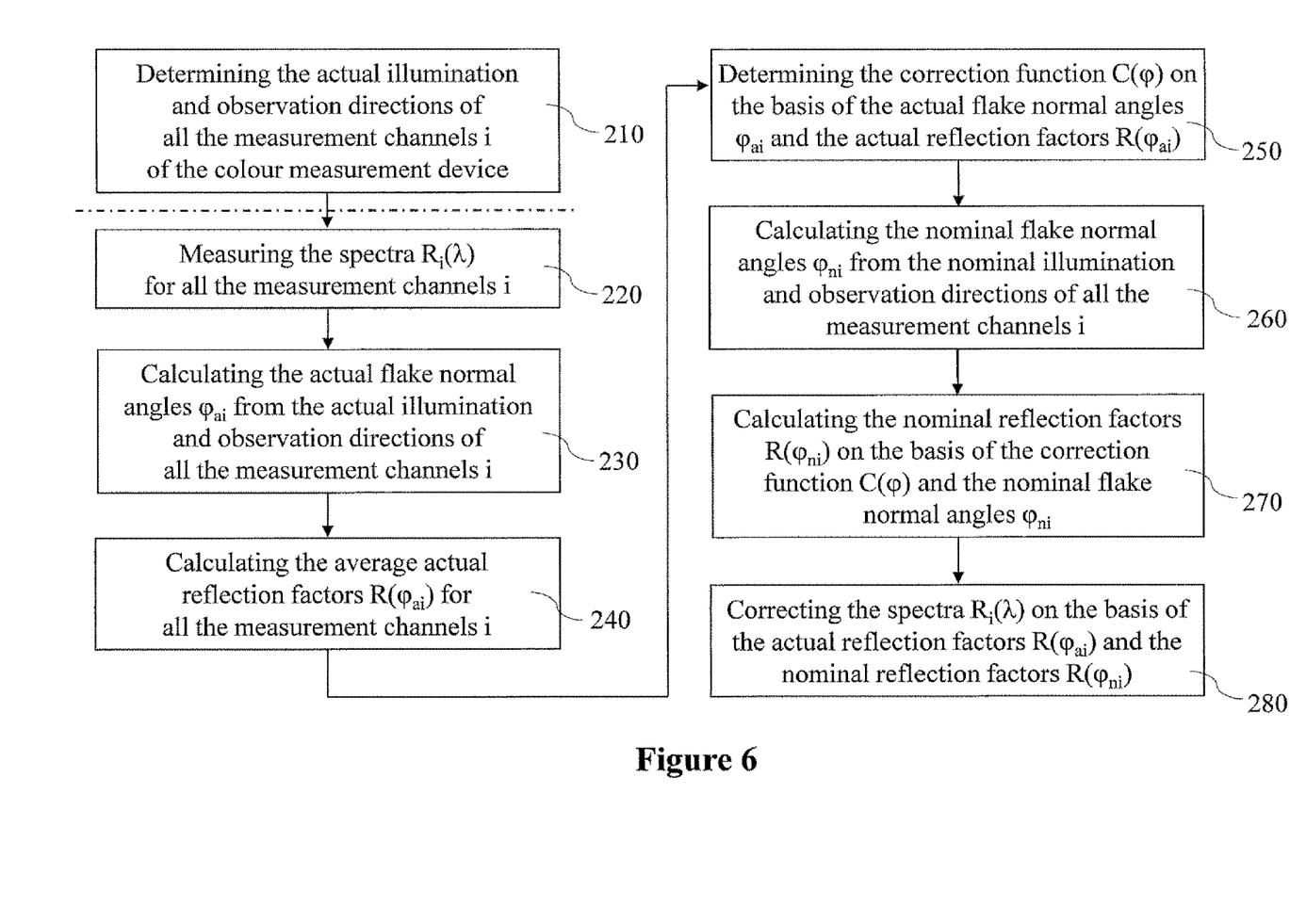
FIG. 6 a block diagram of the most important steps in the colour measurement method in accordance with the invention.

FIG. 6 is a block diagram summarising once again the most important steps in the colour measurement method in accordance with the invention. The individual method steps are indicated by the reference signs 210 to 280. As explicated further above, the method step 210 can also be performed by the manufacturer and/or outside the actual colour measurement method performed by the user. The method step 230 can be performed at any point before the method step 250. The method step 260 can likewise be performed at any point before the method step 270.

The method steps 220 to 280, which process and/or calculate measurement values and other data, are performed subject to the control of the computer-based controller 100 of the colour measurement device in accordance with the invention. The programs necessary for this purpose are stored in the software and/or firmware memory 140 of the controller and run by the micro-controller 110, i.e. the colour measurement device in accordance with the invention differs from known devices of this type substantially in that it is embodied and/or programmed to perform the described steps of the method in accordance with the invention.

The colour measurement method in accordance with the invention is based on a physical underlying concept, namely that of knowing the actual illumination and observation directions of the measurement channels of the measurement device and correcting the (spectral) reflection measurement values of the measurement channels on the basis of the information on the actual illumination and observation directions and the nominal illumination and observation directions predetermined by the measurement geometry and on the basis of a uniform correction model for all the measurement geometries, wherein said correction model is based on the flake angles. This results in a systematic and plausible measurement value correction.

Using the method in accordance with the invention, the measurement data are corrected with respect to distortions in the measurement values caused by angular errors, such that they practically exactly match the measurement data recorded by an ideal colour measurement device (i.e. one which does not exhibit any angular errors) of the same measurement geometry, i.e. the measurement data corrected in this way correspond to the measurement data which would have been measured if the actual illumination and observation directions matched exactly. The method in accordance with the invention also however allows a relative correction which adjusts the measurement data to those of another actual target colour measurement device (of the same measurement geometry) which is subject to angular errors, wherein the (slightly incorrectly aligned) actual illumination and observation directions of the target colour measurement device replace the nominal illumination and observation directions of the device in accordance with the invention. This relative correction is for example advantageous when existing colour measurement devices are to be supplemented or replaced by new colour measurement devices, but a significant amount of measurement data have already been produced by means of the existing colour measurement devices and these measurement data are also to continue to be able to be used. In these cases, the new colour measurement devices have to provide measurement results which are consistent with the existing colour measurement devices.

The measurement array MA can also be conversely embodied with respect to its illumination and observation arrays. Specifically, this means that the measurement object would be illuminated in at least one defined illumination direction only, and the reflected measurement light would instead be detected in three (or more) different observation directions by means of three or more pick-up arrays. Any combinations of one or more illumination arrays and one or more pick-up arrays are of course also possible.

The colour measurement method in accordance with the invention shows its strengths in particular in multi-angle measurements in which the measurement object is illuminated in different illumination directions using a large number of illumination arrays, and the reflected measurement light is measured at different observation directions by two or more pick-up arrays. The use in accordance with the invention of the correction method which is uniform for all the measurement geometries increases the number of effective measurement values for the correction model, which enables improved interpolation of the data and increases accuracy.

Although the present invention has been described with reference to exemplary embodiments, it is to be understood that the present invention is not limited by or to such exemplary embodiments.

The invention claimed is:

1. A colour measurement method, in which a measurement spot (MS) on a measurement object (MO) is exposed to illumination light, by means of a colour measurement device, in at least one actual illumination direction of the colour measurement device, and spectral reflection factors $(R_i(\lambda))$ of the measurement light reflected by the measurement spot (MS) are measured in at least one actual observation direction of the colour measurement device, the method comprising:

forming a continuous correction model $(C(\varphi))$ from the measured reflection factors $(R_i(\lambda))$ and the actual illumination and observation directions of the colour measurement device, where actual and nominal illumination and observation directions of the colour measurement device are transformed into flake normal angles $(\varphi)$, and the correction model $(C(\varphi))$ is calculated in the space of the flake normal angles $(\varphi)$, correction model $(C(\varphi))$ representing a connection between the measured intensity of the measurement light reflected by the measurement spot and changes in the difference in the illumination and observation directions; and correcting the measured reflection factors $(R_i(\lambda))$ on the basis of the correction model $(C(\varphi))$ by incorporating the actual and nominal illumination and observation directions of the colour measurement device to correct for distortions in the measurement values caused by deviations between the actual illumination and observation directions of the colour measurement device and nominal illumination and observation directions predetermined by the measurement geometry of the colour measurement device.

2. The colour measurement method according to claim 1, wherein an actual brightness reflection factor ($R(\varphi_{ai})$) is calculated from the measured reflection factors ($R_i(\lambda)$) for each paired combination (i) of illumination and observation directions, and wherein a nominal brightness reflection factor ($R(\varphi_{ni})$) is calculated from said actual brightness reflection factors ($R(\varphi_{ai})$) in each case on the basis of the correction model ($C(\varphi)$) and the actual and nominal illumination and observation directions of the colour measurement device.

3. The colour measurement method according to claim 2, wherein the measured reflection factors ($R_i(\lambda)$) are corrected on the basis of the actual brightness reflection factors ($R(\varphi_{ai})$) and the nominal brightness reflection factors ($R(\varphi_{ni})$).

4. The colour measurement method according to claim 3, wherein the nominal brightness reflection factors ($R(\varphi_{ni})$) are calculated in the space of the flake normal angles ($\varphi$).

5. The colour measurement method according to claim 4, wherein the nominal brightness reflection factors ($R(\varphi_{ni})$) are calculated from the respective residual between the actual brightness reflection factors ($R(\varphi_{ai})$) and the correction model ($C(\varphi)$).

6. The colour measurement method according to claim 5, wherein the measured reflection factors ($R_i(\lambda)$) are calculated on the basis of the difference between the actual brightness reflection factors ($R(\varphi_{ai})$) and the nominal brightness reflection factors ($R(\varphi_{ni})$).

7. The colour measurement method according to claim 1, wherein the measurement spot (MS) on the measurement object (MO) is exposed to illumination light in at least three, preferably at least five different actual illumination directions.

8. The colour measurement method according to claim 1, wherein the measurement light reflected by the measurement spot (MS) is detected and measured in at least two different actual observation directions.

9. The colour measurement method according to claim 1, wherein a uniform correction model ($C(\varphi)$) is used for all the measurement geometries.

10. The colour measurement method according to claim 1, wherein the actual illumination and observation directions of a target colour measurement device of the same measurement geometry are used as the nominal illumination and observation directions for correcting the measured reflection factors ($R_i(\lambda)$).

11. A colour measurement device, comprising a measurement array (MA) which comprises: at least one illumination array (20, 30, 40) for exposing a measurement spot (MS) on a measurement object (MO) to illumination light in an actual illumination direction (2, 3, 4) in each case, and at least one pick-up array (50) for detecting the measurement light reflected by the measurement spot (MS) in actual observation direction (5) in each case and for converting it into spectral reflection factors ($R_i(\lambda)$); and a computer-based controller (100) for controlling the at least one illumination array and the at least one pick-up array and for processing the reflection factors ($R_i(\lambda)$) produced by the at least one pick-up array, wherein the colour measurement device also comprises means for correcting the measured reflection factors ($R_i(\lambda)$) with respect to distortions in the measurement values caused by deviations between the actual illumination and observation directions of the colour measurement device and nominal illumination and observation directions predetermined by the measurement geometry of the colour measurement device, characterized in that the controller (100) is embodied to form a continuous correction model ($C(\varphi)$) from the measured reflection factors ($R_i(\lambda)$) and the actual illumination and observation directions of the colour measurement device, where the actual and nominal illumination and observation directions of the colour measurement device are transformed into flake normal angles ($\varphi$) and the correction model ($C(\varphi)$) is calculated in the space of the flake normal angles ($\varphi$), wherein said model represents a connection between the measured intensity of the measurement light reflected by the measurement spot and changes in the difference in the illumination and observation directions, and in that the controller (100) is also embodied to correct the measured reflection factors ($R_i(\lambda)$) on the basis of this correction model ($C(\varphi)$) by incorporating the nominal illumination and observation directions of the colour measurement device.

12. The colour measurement device according to claim 11, wherein the controller (100) is embodied to calculate an actual brightness reflection factor ($R(\varphi_{ai})$), which represents the intensity, from the measured reflection factors ($R_i(\lambda)$) for each paired combination of illumination and observation directions, and to calculate a nominal brightness reflection factor ($R(\varphi_{ni})$) from the actual brightness reflection factors ($R(\varphi_{ai})$) in each case on the basis of the correction model ($C(\varphi)$) and the nominal illumination and observation directions of the colour measurement device.

13. The colour measurement device according to claim 12, wherein the controller (100) is embodied to correct the measured reflection factors ($R_i(\lambda)$) on the basis of the actual brightness reflection factors ($R(\varphi_{ai})$) and the nominal brightness reflection factors ($R(\varphi_{ni})$).

14. The colour measurement device according to claim 13, wherein the controller (100) is embodied to calculate the nominal brightness reflection factors ($R\varphi_{ni})$) in the space of the flake normal angles ($\varphi$).

15. The colour measurement device according to claim 14, wherein the controller (100) is embodied to calculate the nominal brightness reflection factors ($R(\varphi_{ni})$) from the respective residual between the actual brightness reflection factors ($R(\varphi_{ai})$) and the correction model ($C(\varphi)$).

16. The colour measurement device according to any one of claim 15, wherein the controller (100) is embodied to calculate the measured reflection factors ($R_i(\lambda)$) on the basis of the difference between the actual brightness reflection factors ($R(\varphi_{ai})$) and the nominal brightness reflection factors ($R(\varphi_{ni})$).

17. The colour measurement device according to claim 11, comprising at least three illumination arrays (20, 30, 40) for illuminating the measurement spot (MS) in different actual illumination directions (2, 3, 4).

18. The colour measurement device according to claim 11, comprising at least five illumination arrays for illuminating the measurement spot (MS) in different actual illumination directions.

* * * * *

UNITED STATES PATENT AND TRADEMARK OFFICE
CERTIFICATE OF CORRECTION

PATENT NO. : 10,260,943 B2
APPLICATION NO. : 15/094779
DATED : April 16, 2019
INVENTOR(S) : Peter Ehbets et al.

It is certified that error appears in the above-identified patent and that said Letters Patent is hereby corrected as shown below:

In the Specification

In Column 10, Line 43, delete "$\varphi_{ai}$" and substitute therefor --$\varphi_{ni}$--.

In Column 10, Line 51, delete "$\varphi_{ai}$" and substitute therefor --$\varphi_{ni}$--.

Signed and Sealed this
Sixteenth Day of July, 2019

Andrei Iancu
*Director of the United States Patent and Trademark Office*